United States Patent
Takazoe (10) Patent No.: US 9,906,948 B2
(45) Date of Patent: Feb. 27, 2018

(54) WIRELESS COMMUNICATION SYSTEM, WIRELESS DEVICES, AND METHOD FOR SETTING ADDRESSES OF SAME

(71) Applicant: Panasonic Intellectual Property Management Co., Ltd., Osaka (JP)

(72) Inventor: Tomoki Takazoe, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 218 days.

(21) Appl. No.: 14/766,846

(22) PCT Filed: Feb. 3, 2014

(86) PCT No.: PCT/JP2014/000542
§ 371 (c)(1),
(2) Date: Aug. 10, 2015

(87) PCT Pub. No.: WO2014/125781
PCT Pub. Date: Aug. 21, 2014

(65) Prior Publication Data
US 2015/0382184 A1    Dec. 31, 2015

(30) Foreign Application Priority Data

Feb. 13, 2013    (JP) ................. 2013-025177

(51) Int. Cl.
*H04W 8/26*    (2009.01)
*H04L 12/40*    (2006.01)
*H04L 29/12*    (2006.01)

(52) U.S. Cl.
CPC ......... *H04W 8/26* (2013.01); *H04L 12/40032* (2013.01); *H04L 61/2521* (2013.01);
(Continued)

(58) Field of Classification Search
CPC .............................. H04W 84/18; H04W 84/12
See application file for complete search history.

(56) References Cited

U.S. PATENT DOCUMENTS 9,338,233 B2 * 5/2016 Raleigh ................. H04L 67/306
2006/0062176 A1 * 3/2006 Ikemura ................ H04W 80/04
370/328

(Continued)

FOREIGN PATENT DOCUMENTS

WO    WO 2012/176550 A1    12/2012

OTHER PUBLICATIONS

Extended European Search Report dated May 2, 2016 for corresponding European Application No. 14751292.5.
(Continued)

*Primary Examiner* — Zhiren Qin
(74) *Attorney, Agent, or Firm* — Renner, Otto, Boisselle & Sklar, LLP (57) ABSTRACT

An address setting method of a wireless communication system includes the steps of generating an address by each of a HEMS controller and a HEMS terminal based on an address prefix included in a router advertisement of a smart meter, and setting, by the HEMS terminal, a route of a packet sent to a HEMS server to a route by way of the HEMS controller. The HEMS controller performs NAT setting by replacing an address prefix of a source address of the packet sent to the HEMS server with an address prefix of the HEMS controller.

6 Claims, 7 Drawing Sheets

(52) U.S. Cl.
CPC ...... *H04L 61/6004* (2013.01); *H04L 61/6022* (2013.01); *H04L 61/6068* (2013.01); *H04L 61/6077* (2013.01); H04L 61/2092 (2013.01); H04L 61/6059 (2013.01); H04L 61/6081 (2013.01)

(56) References Cited

U.S. PATENT DOCUMENTS

| | | | | |
|---|---|---|---|---|
| 2008/0055640 | A1* | 3/2008 | Takahashi | G06F 9/4411 358/1.15 |
| 2009/0316622 | A1* | 12/2009 | Hirano | H04L 45/36 370/328 |
| 2012/0011234 | A1* | 1/2012 | Xu | H04L 29/12358 709/221 |
| 2012/0083937 | A1* | 4/2012 | Kong | G06Q 50/06 700/295 |
| 2012/0229081 | A1* | 9/2012 | Kiuchi | H01M 10/44 320/107 |
| 2013/0232556 | A1* | 9/2013 | Tan | H04L 63/08 726/4 |
| 2014/0098812 | A1* | 4/2014 | Korhonen | H04L 61/2053 370/389 |
| 2014/0112144 | A1 | 4/2014 | Takazoe | |
| 2014/0167979 | A1* | 6/2014 | Soma | H04Q 9/00 340/870.02 |
| 2015/0106519 | A1* | 4/2015 | Lu | H04L 67/28 709/225 |

OTHER PUBLICATIONS

Wasserman Painless Security F Baker Cisco Systems M: 11 I Pv6-to-I Pv6 Network Prefix Translation; rfc6296.txt 11, IPV6-to-IPV6 Network Prefix Translation; RFC6296.txt, Internet Engineering Task Force, IETF; Standard, Internet Society (ISOC) 4, Rue Des Falaises CH-1205 Geneva, Switzerland, Jun. 29, 2011 (Jun. 29, 2011), pp. 1-32, XP015076059.

Draves D Thaler Microsoft R: Default Router Preferences and More-Specific Routes; rfc4191. txt 11, 5. JCT-VC Meeting; 96. MPEG Meeting; Mar. 16, 2011-Mar. 23, 2011; Geneva; (Joint Collaborative Team on Video Coding of ISO/IEC JTC1/SC29/WG11 and ITU-T SG.16 ); URL: http://wftp3.itu.int/av-arch/jctvc-site/, Internet Engineering Task Force, IETF, CH, Nov. 1, 2005 (Nov. 1, 2005), XP015054878.

Bonica Juniper Networks F Baker Cisco 1-6 Systems M Wasserman Painless Security G Miller Verizon W Kumar! Google R et al: 11Multihoming with IPv6-to-IPv6 Network Prefix Translation (NPTv6); draft-bonica-v6-multihome-03.txt 11 , Multihoming With IPv6-To-IPv6 Network Prefix Translation (NPTv6); Draft-Bonica-V6-Multihome-03.txt, Internet Engineering Task Force, IETF; Standardworkingdraft, Internet Society (!SOC) 4, Rue Des Falaises CH-1205 Geneva, Switzerland, Apr. 13, 2012 (Apr. 13, 2012), pp. 1-14, XP015082383.

Shelby Z et al: 11 Nei ghbor Discovery 1-6 Optimization for IPv6 over Low-Power Wireless Personal Area Networks (6LoWPANs); rfc6775.txt 11, Neighbor Discovery Optimization for IPv6 Over Low-Power Wireless Personal Area Networks (6LoWPANS); RFC6775.txt, Internet Engineering Task Force, IETF; Standard, Internet Society (ISOC) 4, Rue Des Falaises CH-1205 Geneva, Switzerland, Nov. 6, 2012 (Nov. 6, 2012), pp. 1-55, XP015086471.

International Search Report for corresponding International Application No. PCT/JP2014/000542 dated Mar. 4, 2014.

Form PCT/ISA/237 for corresponding International Application No. PCT/JP2014/000542 dated Mar. 4, 2014.

Tetsuya Murakami, "Applying IPv6 on low power radio communication", Nikkei Electronics, Jul. 26, 2010, No. 1035, pp. 93 to 105.

Montenegro et al., "Transmission of IPv6 Packets over IEEE 802.15.4 Networks", Microsoft Corporation, Sep. 2007 (cited in the specification).

* cited by examiner

WIRELESS COMMUNICATION SYSTEM, WIRELESS DEVICES, AND METHOD FOR SETTING ADDRESSES OF SAME

TECHNICAL FIELD

The present invention relates to a wireless communication system, wireless devices, and a method for setting addresses of the same. More particularly, the present invention relates to a method for setting addresses in a case where a wireless communication network includes a plurality of wireless devices each serving as an edge router.

BACKGROUND ART

There is known a non-patent document as described below as a standard of 6LoWPAN (IPv6 over Low-Power Wireless Personal Area Networks). The 6LoWPAN allows IPv6 to be used over IEEE 802.15.4.

Home area networks using the 6LoWPAN have been recently considered. Here, users' houses are sometimes equipped with a plurality of networks such as a home energy management system (HEMS) and a smart meter. When a plurality of networks are equipped, a plurality of wireless devices serving as edge routers are also present. For example, in a case where a HEMS is introduced into a house preliminarily equipped with a smart meter, the house is to be installed with two wireless devices, which are the smart meter and a HEMS controller, each serving as an edge router.

When a plurality of wireless devices each serving as an edge router are equipped as described above, HEMS terminals such as an air conditioner and a heat pump composing the HEMS are each assigned with a plurality of IPv6 addresses.

CITATION LIST

Non-Patent Document

Non-Patent Document 1: RFC 4944 Transmission of IPv6 Packets over IEEE 802.15.4 Networks

SUMMARY OF THE INVENTION

Here, HEMS terminals each assigned with a plurality of IPv6 addresses have to determine source addresses, by use of a particular address selecting function, when sending packets. However, since HEMS terminals are generally built-in devices with small resources, the HEMS terminals should prevent processing of selecting a plurality of addresses as much as possible in order to reduce processing loads.

The present invention has been made in view of the above-described circumstances. An object of the present invention is to provide an address setting method capable of preventing a process of selecting addresses at the time of sending packets of wireless terminals even when a plurality of wireless devices serving as edge routers are equipped.

An address setting method of a wireless communication system according to a first invention to solve the problem described above, includes a first wireless device belonging to a first network, a second wireless device belonging to a second network, and a wireless terminal which receives a router advertisement from each of the first wireless device and the second wireless device to set an address, the method including the steps of: sending the router advertisement by the first wireless device; generating an address by each of the second wireless device and the wireless terminal based on an address prefix included in the router advertisement; confirming, by the second wireless device, whether a connection to an external server of the second network via the first wireless device is possible; instructing, by the second wireless device, the wireless terminal to set a route of a packet sent to the external server of the second network to a route by way of the second wireless device when confirming that the connection to the external server via the first wireless device is possible; setting, by the wireless terminal, the route of the packet sent to the external server of the second network to the route by way of the second wireless device; and replacing, by the second wireless device, an address prefix of a source address of the packet with an address prefix of the second wireless device so as to perform address setting when receiving the packet sent to the external server of the second network from the wireless terminal.

An address setting method of a wireless communication system according to a second invention to solve the problem described above, includes a first wireless device belonging to a first network, a second wireless device belonging to a second network, and a wireless terminal which receives a router advertisement from each of the first wireless device and the second wireless device to set an address, the method including the steps of: sending a first router advertisement by the first wireless device; generating an address by each of the second wireless device and the wireless terminal based on an address prefix included in the first router advertisement; confirming, by the second wireless device, whether a connection to an external server of the second network via the first wireless device is possible; sending, by the second wireless device, a second router advertisement for requesting address invalidity when confirming that the connection to the external server via the first wireless device is possible; removing, by the wireless terminal, the address using an address prefix of the second wireless device in accordance with the second router advertisement; instructing, by the second wireless device, the wireless terminal to set a route of a packet sent to the external server of the second network to a route by way of the second wireless device; setting, by the wireless terminal, the route of the packet sent to the external server of the second network to the route by way of the second wireless device; and replacing, by the second wireless device, an address prefix of a source address of the packet with the address prefix of the second wireless device so as to perform address setting when receiving the packet sent to the external server of the second network from the wireless terminal.

A wireless device of a wireless communication system, the system including a plurality of wireless devices belonging to different networks and a wireless terminal which receives a router advertisement from each of the plurality of wireless devices to set an address, according to a third invention to solve the problem described above includes: an address generation unit configured to receive a router advertisement from a first wireless device belonging to a first network to generate an address based on an address prefix included in the router advertisement; a connection confirmation unit configured to confirm whether a connection via the first wireless device to an external server of a second network to which the wireless device belongs is possible; a route setting instruction unit configured to instruct the wireless terminal to set a route of a packet sent to the external server of the second network to a route by way of the wireless device when it is confirmed that the connection via the first wireless device is possible; and an address setting unit configured to replace an address prefix of a source address of the packet with an address prefix of the wireless device so as to perform address setting when receiving the packet sent to the external server of the second network from the wireless terminal.

A wireless device of a wireless communication system, the system including a plurality of wireless devices belonging to different networks and a wireless terminal which receives a router advertisement from each of the plurality of wireless devices to set an address, according to a fourth invention to solve the problem described above includes: an address generation unit configured to receive a first router advertisement from a first wireless device belonging to a first network to generate an address based on an address prefix included in the first router advertisement; a connection confirmation unit configured to confirm whether a connection via the first wireless device to an external server of a second network to which the wireless device belongs is possible; an address invalidity request unit configured to send a second router advertisement for requesting address invalidity when it is confirmed that the connection via the first wireless device is possible; a route setting instruction unit configured to instruct the wireless terminal to set a route of a packet sent to the external server of the second network to a route by way of the wireless device; and an address setting unit configured to replace an address prefix of a source address of the packet with an address prefix of the wireless device so as to perform address setting when receiving the packet sent to the external server of the second network from the wireless terminal.

A wireless communication system according to a fifth invention to solve the problem described above includes a first wireless device belonging to a first network, a second wireless device belonging to a second network, and a wireless terminal which receives a router advertisement from each of the first wireless device and the second wireless device to set an address, the second wireless device including: an address generation unit configured to receive a router advertisement from the first wireless device to generate an address based on an address prefix included in the router advertisement; a connection confirmation unit configured to confirm whether a connection to an external server of the second network via the first wireless device is possible; a route setting instruction unit configured to instruct the wireless terminal to set a route of a packet sent to the external server of the second network to a route by way of the second wireless device when it is confirmed that the connection via the first wireless device is possible; and an address setting unit configured to replace an address prefix of a source address of the packet with an address prefix of the second wireless device so as to perform address setting when receiving the packet sent to the external server of the second network from the wireless terminal, the wireless terminal including: an address generation unit configured to receive the router advertisement from the first wireless device to generate an address based on the address prefix included in the router advertisement; and a route setting unit configured to set the route of the packet sent to the external server of the second network to the route by way of the second wireless device in accordance with a route setting instruction of the second wireless device.

A wireless communication system according to a sixth invention to solve the problem described above includes a first wireless device belonging to a first network, a second wireless device belonging to a second network, and a wireless terminal which receives a router advertisement from each of the first wireless device and the second wireless device to set an address, the second wireless device including: an address generation unit configured to receive a first router advertisement from the first wireless device to generate an address based on an address prefix included in the first router advertisement; a connection confirmation unit configured to confirm whether a connection to an external server of the second network via the first wireless device is possible; an address invalidity request unit configured to send a second router advertisement for requesting address invalidity when it is confirmed that the connection via the first wireless device is possible; a route setting instruction unit configured to instruct the wireless terminal to set a route of a packet sent to the external server of the second network to a route by way of the second wireless device; and an address setting unit configured to replace an address prefix of a source address of the packet with an address prefix of the second wireless device so as to perform address setting when receiving the packet sent to the external server of the second network from the wireless terminal, the wireless terminal including: an address generation unit configured to receive the first router advertisement from the first wireless device to generate an address based on the address prefix included in the first router advertisement; an address change unit configured to remove the address using the address prefix of the second wireless device in accordance with the second router advertisement; and a route setting unit configured to set the route of the packet sent to the external server of the second network to the route by way of the second wireless device in accordance with a route setting instruction of the second wireless device.

DESCRIPTION OF EMBODIMENTS

Hereinafter, first to third embodiments to which the present invention is applied will be explained with reference to the drawings.

[First Embodiment]

[Configuration of Wireless Communication System]

Figure 1:
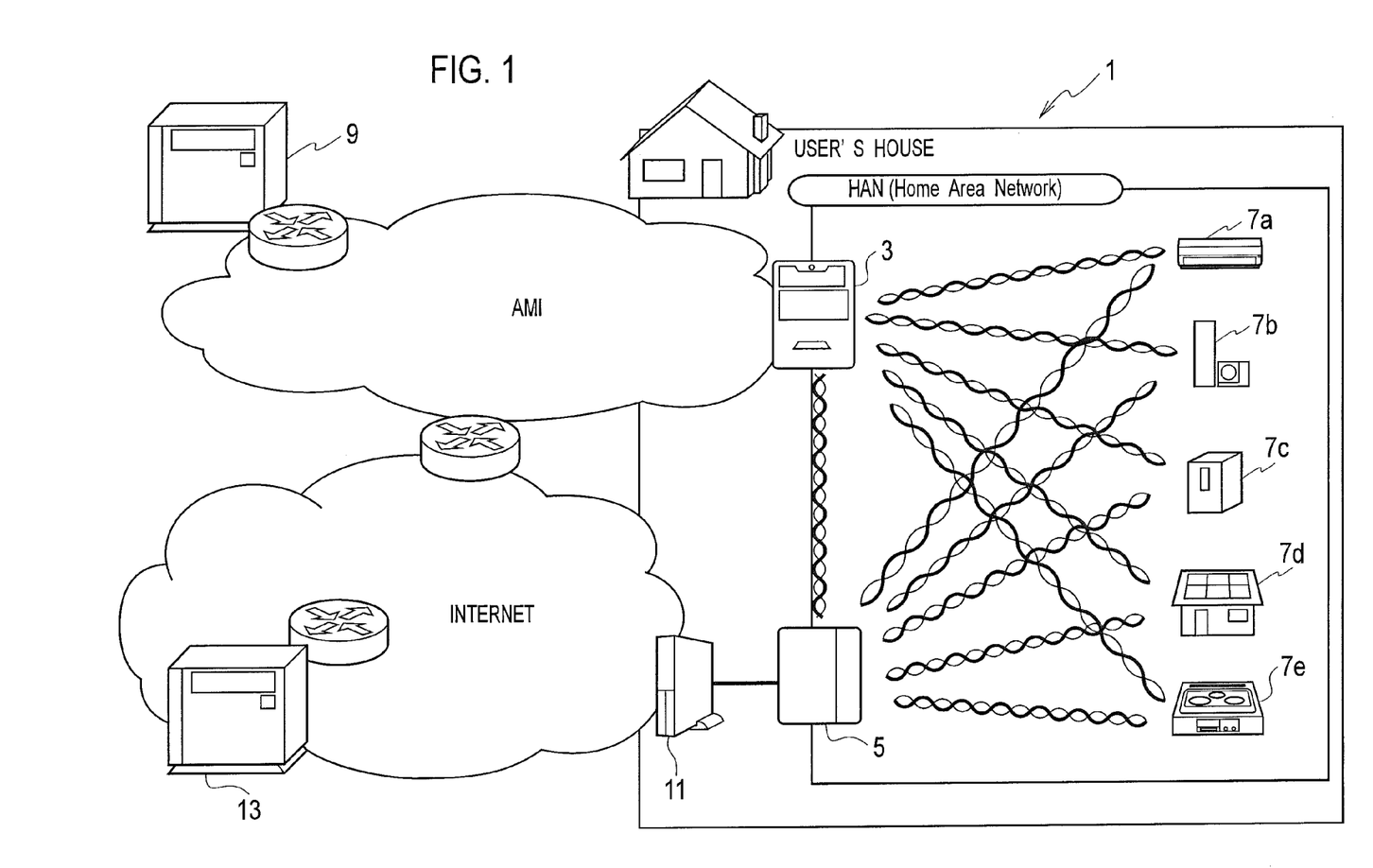
FIG. 1 is a diagram showing a configuration of a wireless communication system according to a first embodiment of the present invention.

FIG. 1 is a diagram showing a configuration of a wireless communication system according to the present embodiment. As shown in FIG. 1, the wireless communication system 1 according to the present embodiment includes a smart meter 3, a HEMS controller 5 of a home energy management system (hereinafter, referred to as "HEMS"), and HEMS terminals 7a to 7e.

The wireless communication system 1 includes a plurality of wireless devices serving as edge routers. The smart meter 3 and the HEMS controller 5 shown in FIG. 1 are the wireless devices serving as edge routers. The present embodiment exemplifies a case of a home area network (HAN) installed in a user's house. This network is equipped with 6LoWPAN/IPv6 over a data link layer of IEEE 802.15.4.

The smart meter 3 is a first wireless device configured as a terminal of an advanced metering infrastructure (AMI) as a first network. Since the AMI is an electric power metering system, the smart meter 3 uploads metered values of electric power in a house to an electric company server 9 via the AMI. Here, wireless devices used in IEEE 802.15.4 have a master-slave relationship. Since the smart meter 3 has a function of a full function device (FFD), the smart meter 3 serves as a master (coordinator). Therefore, the smart meter 3 serves as an edge router to send a router advertisement and distribute an address prefix.

The HEMS controller 5 is a second wireless device included in the HEMS as a second network. The HEMS controller 5 in the HEMS collects values of electric power consumption and the like from the HEMS terminals 7a to 7e and provides several kinds of energy management functions. The HEMS controller 5 also has a function of a FFD and serves as a master (coordinator). Therefore, the HEMS controller 5 serves as an edge router to send a router advertisement and distribute an address prefix. However, the HEMS controller serves as a slave with respect to the smart meter 3. Thus, the HEMS controller 5 receives the router advertisement from the smart meter 3 so as to determine an IPv6 address based on the address prefix included in the router advertisement and a Mac address of the HEMS controller 5. The HEMS controller 5 is connected to a HEMS server 13 on the Internet by way of a broadband router 11.

The HEMS terminals 7a to 7e are wireless terminals included in the HEMS. FIG. 1 shows, as examples thereof, an air conditioner, a natural refrigerant heat pump water heater, a storage battery, a solar power generation device, and an IH cooking heater. The HEMS terminals 7a to 7e are also reduced function devices (RFD) only equipped with limited functions and each serve as a slave with respect to the HEMS controller 5. Thus, the HEMS terminals 7a to 7e each receive the router advertisement from each of the smart meter 3 and the HEMS controller 5 so as to determine an IPv6 address based on the address prefix included in the router advertisement and a Mac address of the respective HEMS terminals 7a to 7e.

Figure 2:
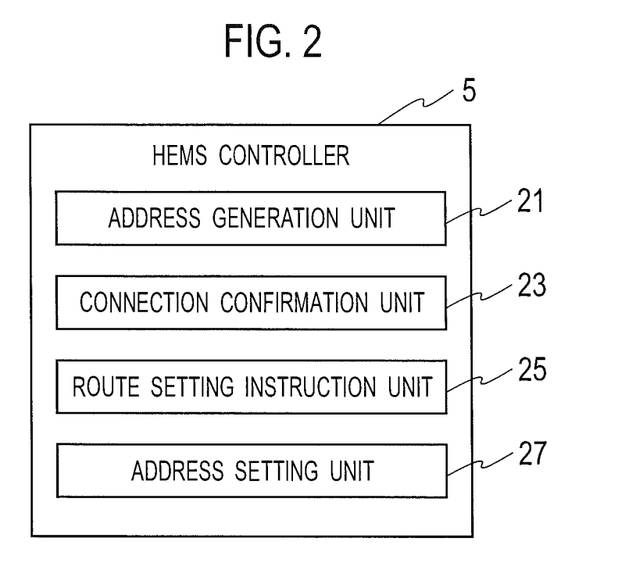
FIG. 2 is a block diagram showing a configuration of a HEMS controller of the wireless communication system according to the first embodiment of the present invention.

Next, the configuration of the HEMS controller 5 is explained with reference to FIG. 2. As shown in FIG. 2, the HEMS controller 5 includes an address generation unit 21, a connection confirmation unit 23, a route setting instruction unit 25, and an address setting unit 27.

The address generation unit 21 receives the router advertisement from the smart meter 3 to generate the IPv6 address based on the address prefix included in the router advertisement and its own Mac address.

The connection confirmation unit 23 confirms whether a connection to the HEMS server 13 via the smart meter 3 is possible.

The route setting instruction unit 25 instructs the respective HEMS terminals 7a to 7e to set a route of a packet sent to the HEMS server 13 to a route by way of the HEMS controller 5 when it is confirmed that the connection to the HEMS server 13 via the smart meter 3 is possible.

The address setting unit 27 replaces an address prefix of a source address of the packet with the address prefix of the HEMS controller 5 to perform address setting when the address setting unit 27 receives the packet sent to the HEMS server 13 from the respective HEMS terminals 7a to 7e.

The HEMS controller 5 includes a general-purpose electric circuit including a microcomputer, a microprocessor and a CPU, and peripheral equipment. The HEMS controller 5 executes particular programs so as to operate as the address generation unit 21, the connection confirmation unit 23, the route setting instruction unit 25, and the address setting unit 27.

Figure 3:
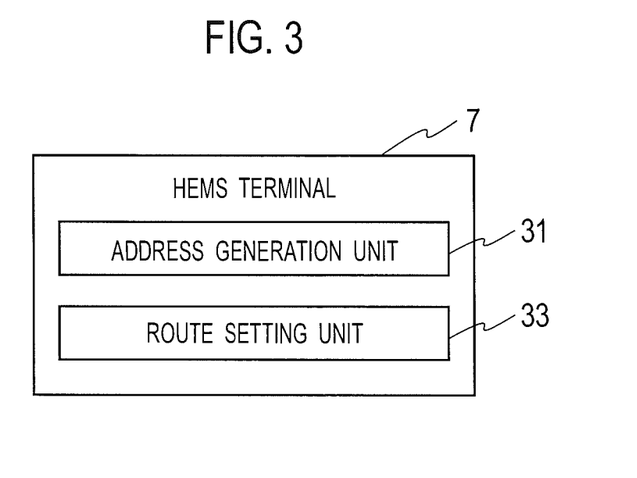
FIG. 3 is a block diagram showing a HEMS terminal of the wireless communication system according to the first embodiment of the present invention.

Next, the configuration of the HEMS terminals 7a to 7e is explained with reference to FIG. 3. As shown in FIG. 3, the HEMS terminals 7a to 7e each include an address generation unit 31 and a route setting unit 33.

The address generation unit 31 receives the router advertisement from each of the smart meter 3 and the HEMS controller 5 to generate the IPv6 address based on the address prefix included in the router advertisement and its own Mac address.

The route setting unit 33 sets the route of the packet sent to the HEMS server 13 to the route by way of the HEMS controller 5 in accordance with the route setting instruction of the HEMS controller 5.

The respective HEMS terminals 7a to 7e include a general-purpose electric circuit including a microcomputer, a microprocessor and a CPU, and peripheral equipment. The respective HEMS terminals 7a to 7e execute particular programs so as to operate as the address generation unit 31 and the route setting unit 33

[Process of Address Setting]

Next, a process of address setting in the wireless communication system 1 according to the present embodiment is explained with reference to the sequence diagram shown in FIG. 4. The present embodiment exemplifies a case where the HEMS is introduced into a house preliminarily equipped with the smart meter 3.

Figure 4:
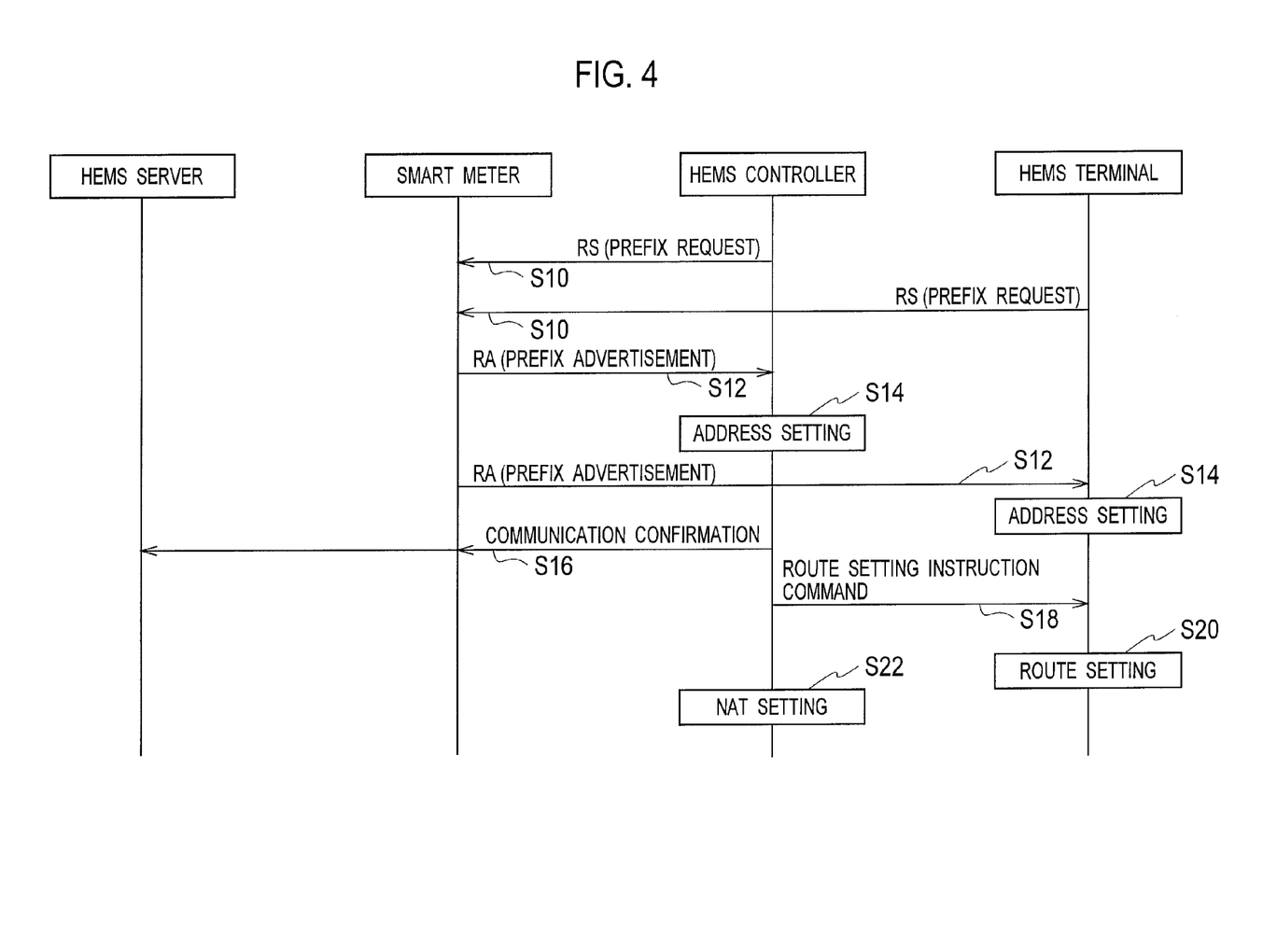
FIG. 4 is a sequence diagram showing a processing procedure of address setting in the wireless communication system according to the first embodiment of the present invention.

As shown in FIG. 4, the introduced HEMS controller 5 sends a router solicitation (RS: prefix request) in step S10. The HEMS controller 5 thus makes a request to the smart meter 3 for a router advertisement (RA: prefix advertisement). Note that the RS is not necessarily sent by the HEMS controller 5 and may be sent by the HEMS terminals 7a to 7e or by both of them. Alternatively, the RS is not necessarily made since the router advertisement requested by the RS is periodically sent by the smart meter 3.

The smart meter 3 having received the RS then sends the router advertisement to the HEMS controller 5 and the HEMS terminals 7a to 7e so as to notify the address prefix in step S12.

In step S14, the address generation unit 21 of the HEMS controller 5 and the address generation unit 31 of the HEMS terminals 7a to 7e each generate the IPv6 address when receiving the router advertisement from the smart meter 3. The address generation units 21 and 31 each generate the IPv6 address by combining the address prefix of the smart meter 3 included in the router advertisement and their own MAC addresses or an EUI-64 format address. The respective address generation units 21 and 31 then set the generated IPv6 address automatically for a network interface. As a result, the connections between the smart meter 3 and the HEMS controller 5 and between the smart meter 3 and the HEMS terminals 7a to 7e are established.

When the IPv6 address is determined, the connection confirmation unit 23 of the HEMS controller 5 confirms whether the connection to the HEMS server 13 as an external server on the Internet via the smart meter 3 is possible in step S16.

When it is confirmed that the connection to the HEMS server 13 via the smart meter 3 is possible, the route setting instruction unit 25 of the HEMS controller 5 sends a route setting instruction command to the respective HEMS terminals 7a to 7e in step S18. This route setting instruction command is to instruct the respective HEMS terminals 7a to 7e to set the route of the packet sent to the HEMS server 13 to the route by way of the HEMS controller 5.

The route setting unit 33 of the HEMS terminals 7a to 7e having received the route setting instruction command sets a routing table in accordance with the route setting instruction command in step S20. In particular, the route setting unit 33 sets the routing table in such a manner as to set the route of the packet sent to the HEMS server 13 to the route by way of the HEMS controller 5.

The address setting unit 27 of the HEMS controller 5 then performs NAT setting of the packet sent to the HEMS server 13 from the respective HEMS terminals 7a to 7e in step S22. In the NAT setting, the prefix of the source IPv6 address of the packet sent to the HEMS server 13 from the respective HEMS terminals 7a to 7e via the HEMS controller 5 is replaced with the address prefix of the HEMS controller 5.

Accordingly, the address setting in the wireless communication system 1 according to the present embodiment ends once the NAT setting is performed.

Figure 5:
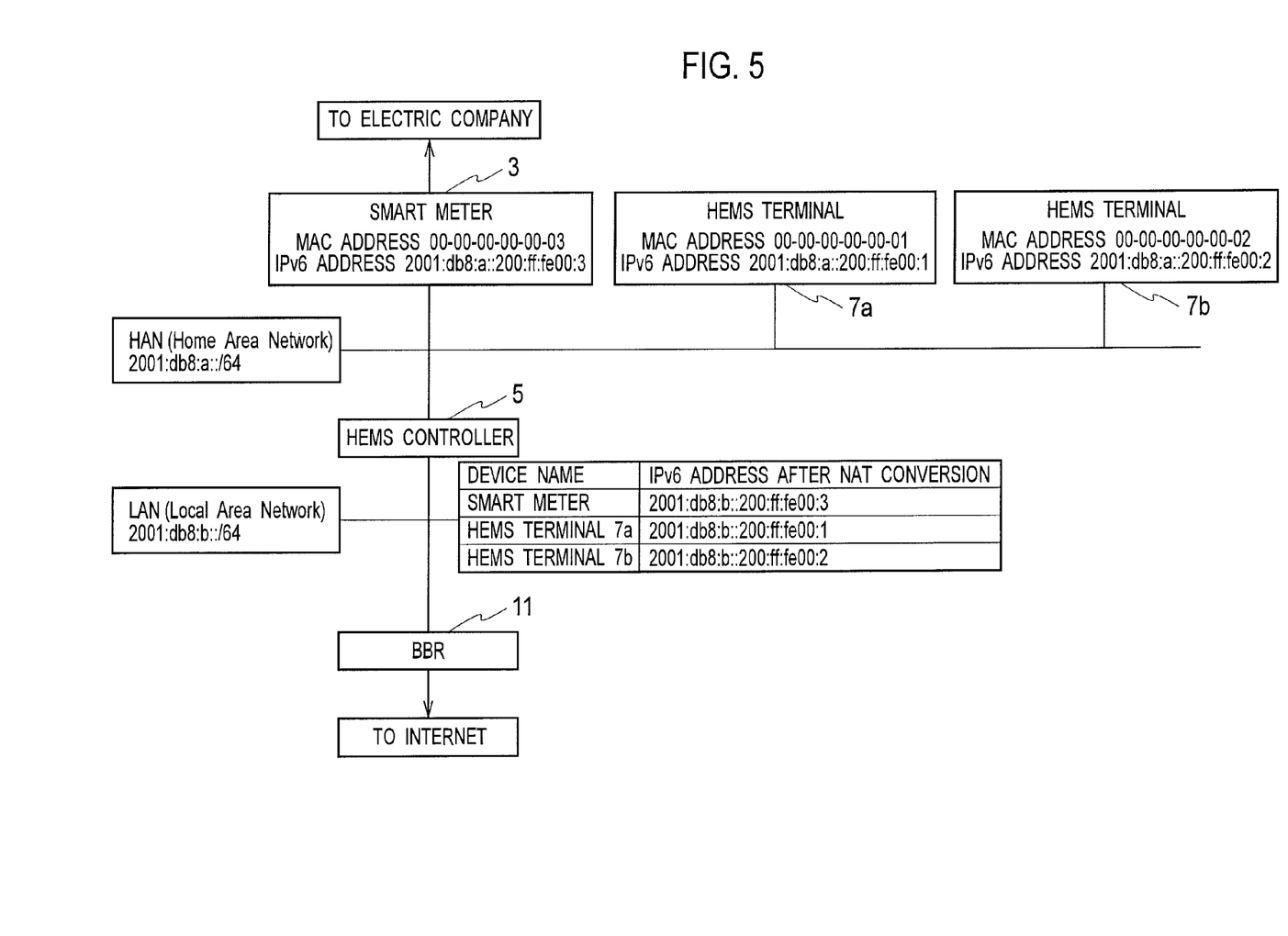
FIG. 5 is a diagram for explaining an address conversion operation by the wireless communication system according to the first embodiment of the present invention.

Next, an address conversion operation by the HEMS controller 5 is explained with reference to FIG. 5. As shown in FIG. 5, when the HEMS terminal 7a communicates with the HEMS server 13, the HEMS terminal 7a refers to its own routing table. Here, the routing table is provided with an instruction that the packet sent to the HEMS server 13 is sent toward the HEMS controller 5.

The HEMS terminal 7a thus assigns its own address, 2001:db8:a::200:ff:fe00:1, to the source address and sends the packet to the HEMS controller 5. This IPv6 address uses the address prefix distributed from the smart meter 3. The HEMS controller 5 having received this packet rewrites the prefix of the source address of the received packet to replace it with a LAN-side prefix of the HEMS controller 5. In other words, the HEMS controller 5 converts the IPv6 address to 2001:db8:b::200:ff:fe00:1 and transfers the address to the HEMS server 13.

According to the present embodiment, the route by way of the HEMS controller 5 is set for the routing table of the respective HEMS terminals 7a to 7e, and the HEMS controller 5 rewrites the prefix of the source address and sends it to the HEMS server 13. Accordingly, the packet can be sent to the HEMS server 13 in a manner such that the respective HEMS terminals 7a to 7e are only assigned with the IPv6 address using the prefix of the smart meter 3.

[Effect of First Embodiment]

As described in detail above, the address setting method of the wireless communication system 1 according to the present embodiment assigns the IPv6 address using the address prefix of the smart meter 3 to the respective HEMS terminals 7a to 7e. In addition, the route of the packet sent to the HEMS server 13 is set to the route by way of the HEMS controller 5, and the HEMS controller 5 replaces the prefix of the source address of the packet with its own address prefix. Accordingly, the process of selecting addresses can be avoided when sending the packet even when a plurality of wireless devices serving as edge routers are equipped, since the respective HEMS terminals 7a to 7e are only required to be assigned with the address using the prefix of the smart meter 3.

[Second Embodiment]

Next, a wireless communication system according to the second embodiment of the present invention is explained below with reference to the drawings. The configuration of the wireless communication system according to the present embodiment is the same as that of the first embodiment shown in FIG. 1. Therefore, the same elements are indicated by the same reference numerals as those in the first embodiment, and specific explanations thereof are not repeated below.

Figure 6:
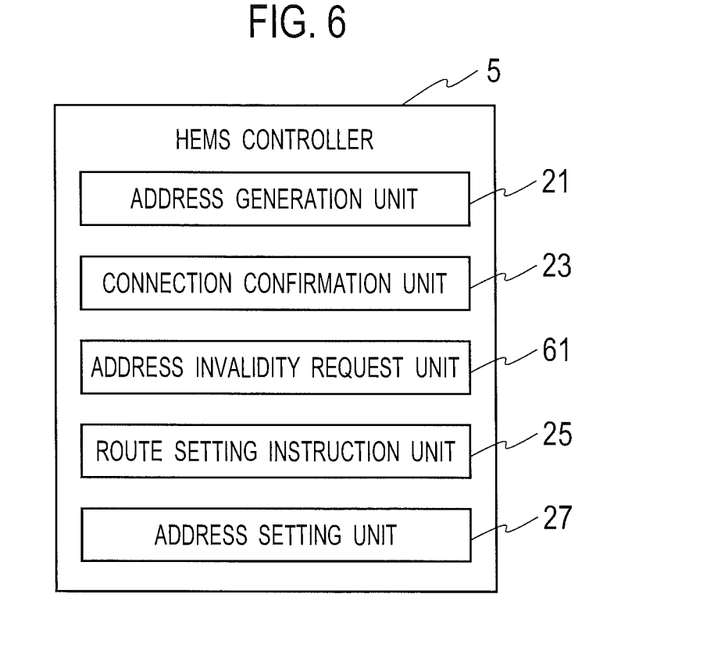
FIG. 6 is a block diagram showing a configuration of a HEMS controller of a wireless communication system according to a second embodiment of the present invention.

The configuration of the HEMS controller 5 according to the present embodiment is explained with reference to FIG. 6. As shown in FIG. 6, the HEMS controller 5 according to the present embodiment differs from that of the first embodiment in further including an address invalidity request unit 61.

The address invalidity request unit 61 sends a router advertisement for requesting address invalidity when it is confirmed that the connection via the smart meter 3 is possible. More particularly, the address invalidity request unit 61 sends the router advertisement in which Router LifeTime is set to 0 so as to make a request to the HEMS terminals 7a to 7e for address invalidity.

Figure 7:
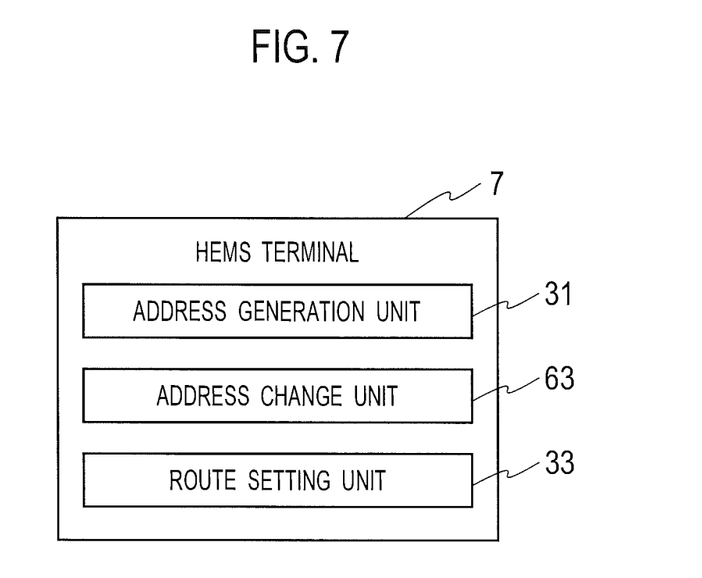
FIG. 7 is a block diagram showing a HEMS terminal of the wireless communication system according to the second embodiment of the present invention.

Next, the configuration of the HEMS terminals 7a to 7e according to the present embodiment is explained with reference to FIG. 7. As shown in FIG. 7, the respective HEMS terminals 7a to 7e according to the present embodiment differ from those of the first embodiment in further including an address change unit 63.

The address change unit 63 removes the address using the address prefix of the HEMS controller 5 in accordance with the address invalidity request by the HEMS controller 5. More particularly, when receiving the router advertisement in which the Router LifeTime is set to 0 from the HEMS controller 5, the address change unit 63 removes the address using the address prefix of the HEMS controller 5 from its own network.

[Process of Address Setting]

Next, a process of address setting in the wireless communication system according to the present embodiment is explained with reference to the sequence diagram shown in FIG. 8. The present embodiment exemplifies a case where the smart meter 3 is installed in a house into which the HEMS is preliminarily introduced.

Figure 8:
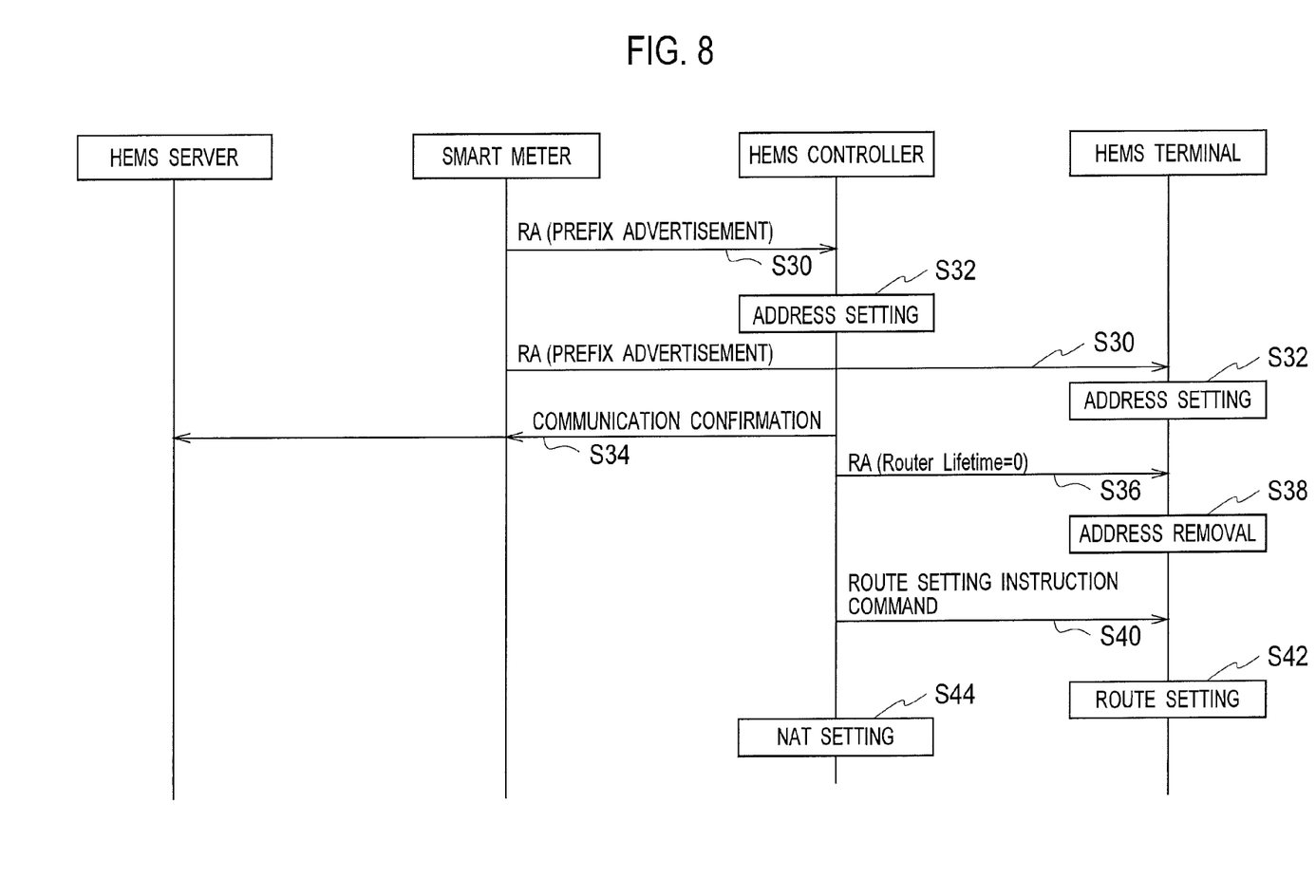
FIG. 8 is a sequence diagram showing a processing procedure of address setting in the wireless communication system according to the second embodiment of the present invention.

As shown in FIG. 8, when the smart meter 3 is installed, the smart meter 3 sends the router advertisement to the HEMS controller 5 and the HEMS terminals 7a to 7e to notify the address prefix of the IPv6 address in step S30.

In step S32, the address generation unit 21 of the HEMS controller 5 and the address generation unit 31 of the HEMS terminals 7a to 7e each generate the IPv6 address when receiving the router advertisement from the smart meter 3.

When the IPv6 address is determined, the connection confirmation unit 23 of the HEMS controller 5 confirms whether the connection to the HEMS server 13 as an external server on the Internet via the smart meter 3 is possible in step S34.

When it is confirmed that the connection to the HEMS server 13 via the smart meter 3 is possible, the address invalidity request unit 61 of the HEMS controller 5 sends the router advertisement for requesting address invalidity in step S36. More particularly, the address invalidity request unit 61 sends the router advertisement in which Router LifeTime is set to 0 so as to make a request to the HEMS terminals 7a to 7e for address invalidity.

In step S38, the address change unit 63 of the HEMS terminals 7a to 7e removes the address using the address prefix of the HEMS controller 5 in accordance with the router advertisement for requesting the address invalidity. More particularly, when receiving the router advertisement in which the Router LifeTime is set to 0 from the HEMS controller 5, the address change unit 63 removes the address using the address prefix of the HEMS controller 5 from its own network.

In step S40, the route setting instruction unit 25 of the HEMS controller 5 sends a route setting instruction command to the respective HEMS terminals 7a to 7e. This route setting instruction command is to instruct the respective HEMS terminals 7a to 7e to set the route of the packet sent to the HEMS server 13 to the route by way of the HEMS controller 5.

The route setting unit 33 of the HEMS terminals 7a to 7e having received the route setting instruction command sets a routing table in step S42 in accordance with the route setting instruction command. In particular, the route setting unit 33 sets the routing table in such a manner as to set the route of the packet sent to the HEMS server 13 to the route by way of the HEMS controller 5.

The address setting unit 27 of the HEMS controller 5 then performs NAT setting of the packet sent to the HEMS server 13 from the respective HEMS terminals 7a to 7e in step S44. In the NAT setting, the prefix of the source IPv6 address of the packet sent to the HEMS server 13 from the respective HEMS terminals 7a to 7e via the HEMS controller 5 is replaced with the address prefix of the HEMS controller 5.

Accordingly, the address setting in the wireless communication system according to the present embodiment ends once the NAT setting is performed.

[Effect of Second Embodiment]

As described in detail above, the address setting method of the wireless communication system according to the present embodiment sets the address using the address prefix of the smart meter 3 and removes the address using the address prefix of the HMES controller 5. In addition, the route of the packet sent to the HEMS server 13 is set to the route by way of the HEMS controller 5, and the prefix of the source address of the packet is replaced with the address prefix of the HEMS controller 5. Accordingly, the process of selecting addresses can be avoided when sending the packet even when a plurality of wireless devices serving as edge routers are equipped, since the respective HEMS terminals 7a to 7e are only required to be assigned with the address using the prefix of the smart meter 3.

[Third Embodiment]

Next, a wireless communication system according to the third embodiment of the present invention is explained below with reference to the drawings. The configuration of the wireless communication system according to the present embodiment is the same as that of the first embodiment shown in FIG. 1. Therefore, the same elements are indicated by the same reference numerals as those in the first embodiment, and specific explanations thereof are not repeated below.

[Process of Address Setting]

A process of address setting in the wireless communication system according to the present embodiment is explained with reference to the sequence diagram shown in FIG. 9. While the above-described embodiment explained the method of setting the routing table of the HEMS terminals 7a to 7e, the present embodiment exemplifies a case where the smart meter 3 notifies the HEMS terminals 7a to 7e of a route change, instead of rewriting the routing table.

Figure 9:
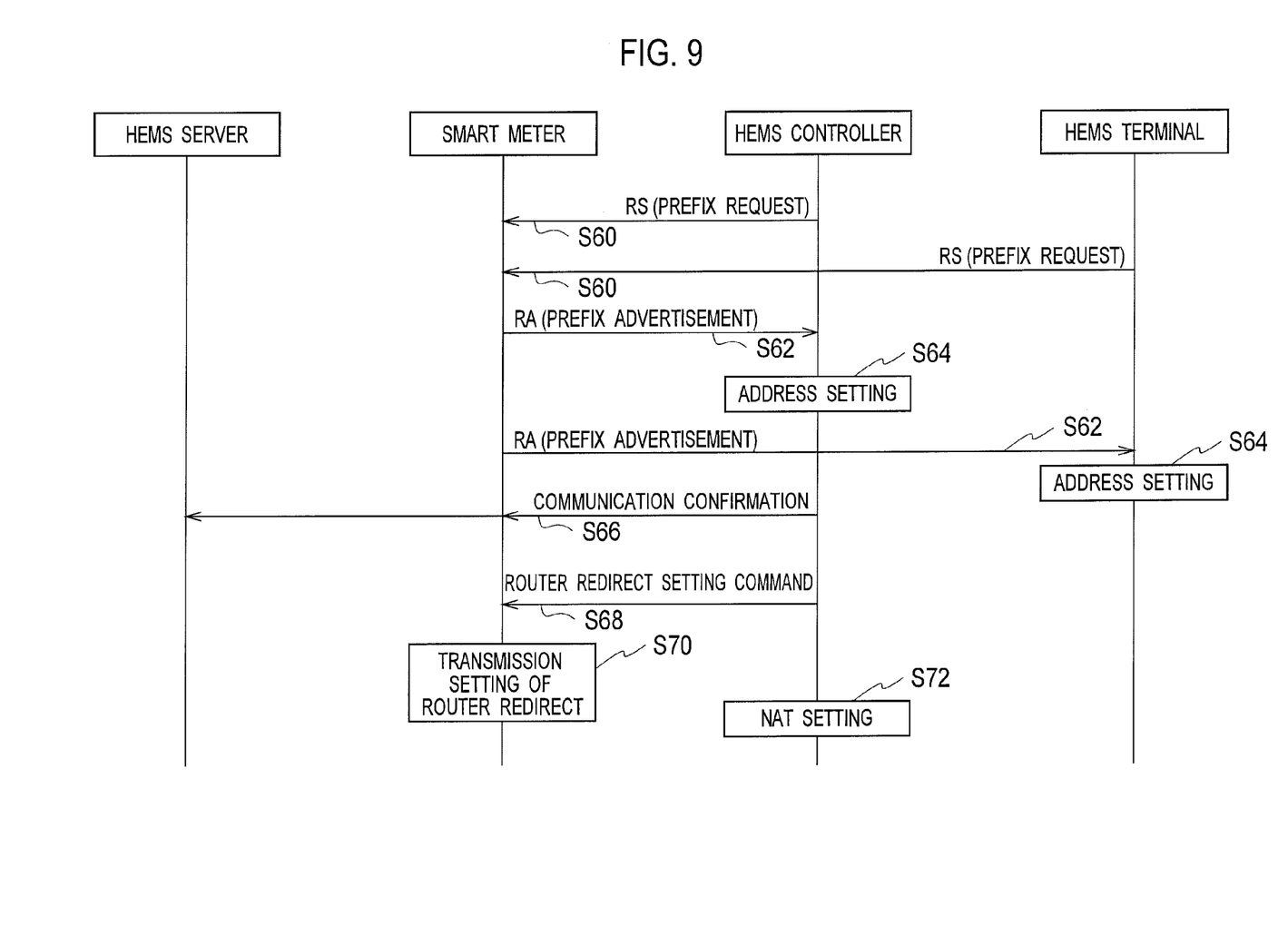
FIG. 9 is a sequence diagram showing a processing procedure of address setting in a wireless communication system according to a third embodiment of the present invention.

The processing from step S60 to step S66 shown in FIG. 9 is the same as that from step S10 to step S16 shown in FIG. 4 as explained in the first embodiment, and the explanation thereof is thus not repeated below.

When the HEMS controller 5 confirms that the connection to the HEMS server 13 via the smart meter 3 is possible in step S66, the HEMS controller 5 sends a router redirect setting command to the smart meter 3 in step S68.

The smart meter 3 having received the router redirect setting command then performs transmission setting of a router redirect message in step S70. In particular, when the smart meter 3 receives the packet sent to the HEMS server 13 from the respective HEMS terminals 7a to 7e, the smart meter 3 is configured to send the router redirect message to the respective HEMS terminals 7a to 7e.

The router redirect message is to instruct the respective HEMS terminals 7a to 7e to change the route of the packet sent to the HEMS server 13 to the route by way of the HEMS controller 5. Thus, the respective HEMS terminals 7a to 7e having received the router redirect message send the packet by retrying to set the route of the packet sent to the HEMS server 13 to the route according to the instruction of the router redirect message.

Thereafter, the address setting unit 27 of the HEMS controller 5 performs NAT setting of the packet sent to the HEMS server 13 from the respective HEMS terminals 7a to 7e in step S72. In the NAT setting, the prefix of the source IPv6 address of the packet sent to the HEMS server 13 from the respective HEMS terminals 7a to 7e via the HEMS controller 5 is replaced with the address prefix of the HEMS controller 5.

Accordingly, the address setting in the wireless communication system according to the present embodiment ends once the NAT setting is performed.

[Effect of Third Embodiment]

As described in detail above, the address setting method of the wireless communication system according to the present embodiment performs the router redirect setting on the smart meter 3 so as to set again the route of the packet sent to the HEMS server 13 to the route by way of the HEMS controller 5. The HEMS controller 5 replaces the prefix of the source address of the packet with the address prefix of the HEMS controller 5. Accordingly, the process of selecting addresses can be avoided when sending the packet even when a plurality of wireless devices serving as edge routers are equipped, since the respective HEMS terminals 7a to 7e are only required to be assigned with the address using the prefix of the smart meter 3. Further, the setting process can be simplified since the route via the smart meter 3 as a default route is only required to be set for the respective HEMS terminals 7a to 7e.

The embodiments described above are examples of the present invention. Therefore, the present invention is not limited to the embodiments described above, and it will be apparent to those skilled in the art that various modifications and improvements can be made depending on designs other than the embodiments without departing from the scope of the present invention.

The entire content of Japanese Patent Application No. P2013-025177 (filed on Feb. 13, 2013) is herein incorporated by reference.

INDUSTRIAL APPLICABILITY

According to the present invention, the respective wireless terminals are only assigned with the address using the address prefix of the first wireless device. Therefore, the present invention can provide the wireless communication system, the wireless devices and the method for setting the addresses thereof capable of preventing the wireless terminals from selecting addresses when sending packets even when a plurality of wireless devices serving as edge routers are equipped.

REFERENCE SIGNS LIST

1 WIRELESS COMMUNICATION SYSTEM
3 SMART METER (FIRST WIRELESS DEVICE)
5 HEMS CONTROLLER (SECOND WIRELESS DEVICE)
7a to 7e HEMS TERMINAL (WIRELESS TERMINAL)
9 ELECTRIC COMPANY SERVER
11 BROADBAND ROUTER
13 HEMS SERVER (EXTERNAL SERVER)
21, 31 ADDRESS GENERATION UNIT
23 CONNECTION CONFIRMATION UNIT
25 ROUTE SETTING INSTRUCTION UNIT
27 ADDRESS SETTING UNIT
33 ROUTE SETTING UNIT
61 ADDRESS INVALIDITY REQUEST UNIT
63 ADDRESS CHANGE UNIT

The invention claimed is:

1. An address setting method of a wireless communication system including a first wireless device belonging to a first network, a second wireless device belonging to a second network, and a wireless terminal which receives a router advertisement from each of the first wireless device and the second wireless device to set an address, the method comprising the steps of:
   sending the router advertisement by the first wireless device;
   generating an address by the second wireless device based on a first address prefix included in the router advertisement;
   generating an address by the wireless terminal based on a second address prefix included in the router advertisement;
   confirming, by the second wireless device, whether a connection to an external server of the second network via the first wireless device is possible;
   instructing, by the second wireless device, the wireless terminal to set a route of a packet sent to the external server of the second network to a route by way of the second wireless device when confirming that the connection to the external server via the first wireless device is possible;
   setting, by the wireless terminal, the route of the packet sent to the external server of the second network to the route by way of the second wireless device; and
   replacing, by the second wireless device, the second address prefix of a source address of the packet with the first address prefix of the second wireless device so as to perform address setting when receiving the packet sent to the external server of the second network from the wireless terminal.

2. An address setting method of a wireless communication system including a first wireless device belonging to a first network, a second wireless device belonging to a second network, and a wireless terminal which receives a router advertisement from each of the first wireless device and the second wireless device to set an address, the method comprising the steps of:
   sending a first router advertisement by the first wireless device;
   generating an address by the second wireless device based on a first address prefix included in the first router advertisement;
   generating an address by the wireless terminal based on a second address prefix included in the first router advertisement;
   confirming, by the second wireless device, whether a connection to an external server of the second network via the first wireless device is possible;
   sending, by the second wireless device, a second router advertisement for requesting address invalidity when confirming that the connection to the external server via the first wireless device is possible;
   removing, by the wireless terminal, the address using the first address prefix of the second wireless device in accordance with the second router advertisement;
   instructing, by the second wireless device, the wireless terminal to set a route of a packet sent to the external server of the second network to a route by way of the second wireless device;
   setting, by the wireless terminal, the route of the packet sent to the external server of the second network to the route by way of the second wireless device; and
   replacing, by the second wireless device, the second address prefix of a source address of the packet with the first address prefix of the second wireless device so as to perform address setting when receiving the packet sent to the external server of the second network from the wireless terminal.

3. A wireless device of a wireless communication system including a plurality of wireless devices belonging to different networks and a wireless terminal which receives a router advertisement from each of the plurality of wireless devices to set an address, the wireless device comprising:
   an address generation circuit configured to receive a router advertisement from a first wireless device belonging to a first network to generate an address based on a first address prefix included in the router advertisement;
   a connection confirmation circuit configured to confirm whether a connection via the first wireless device to an external server of a second network to which the wireless device belongs is possible;
   a route setting instruction circuit configured to instruct the wireless terminal to set a route of a packet sent to the external server of the second network to a route by way of the wireless device when it is confirmed that the connection via the first wireless device is possible; and
   an address setting circuit configured to replace a second address prefix of a source address of the packet with the first address prefix of the wireless device, wherein the second address prefix is included in the router advertisement, so as to perform address setting when receiving the packet sent to the external server of the second network from the wireless terminal.

4. A wireless device of a wireless communication system including a plurality of wireless devices belonging to different networks and a wireless terminal which receives a router advertisement from each of the plurality of wireless devices to set an address, the wireless device comprising:
   an address generation circuit configured to receive a first router advertisement from a first wireless device belonging to a first network to generate an address based on an address prefix included in the first router advertisement;
a connection confirmation circuit configured to confirm whether a connection via the first wireless device to an external server of a second network to which the wireless device belongs is possible;
an address invalidity request circuit configured to send a second router advertisement for requesting invalidity of the address when it is confirmed that the connection via the first wireless device is possible;
a route setting instruction circuit configured to instruct the wireless terminal to set a route of a packet sent to the external server of the second network to a route by way of the wireless device; and
an address setting circuit configured to replace a second address prefix of a source address of the packet with the first address prefix of the wireless device, wherein the second address prefix is included in the router advertisement, so as to perform address setting when receiving the packet sent to the external server of the second network from the wireless terminal.

5. A wireless communication system including a first wireless device belonging to a first network, a second wireless device belonging to a second network, and a wireless terminal which receives a router advertisement from each of the first wireless device and the second wireless device to set an address,
the second wireless device comprising:
an address generation circuit configured to receive a router advertisement from the first wireless device to generate an address based on a first address prefix included in the router advertisement;
a connection confirmation circuit configured to confirm whether a connection to an external server of the second network via the first wireless device is possible;
a route setting instruction circuit configured to instruct the wireless terminal to set a route of a packet sent to the external server of the second network to a route by way of the second wireless device when it is confirmed that the connection via the first wireless device is possible; and
an address setting circuit configured to replace a second address prefix of a source address of the packet with the first address prefix of the second wireless device so as to perform address setting when receiving the packet sent to the external server of the second network from the wireless terminal,
the wireless terminal comprising:
an address generation circuit configured to receive the router advertisement from the first wireless device to generate an address based on a the second address prefix included in the router advertisement; and
a route setting circuit configured to set the route of the packet sent to the external server of the second network to the route by way of the second wireless device in accordance with a route setting instruction of the second wireless device.

6. A wireless communication system including a first wireless device belonging to a first network, a second wireless device belonging to a second network, and a wireless terminal which receives a router advertisement from each of the first wireless device and the second wireless device to set an address,
the second wireless device comprising:
an address generation circuit configured to receive a first router advertisement from the first wireless device to generate a first address based on a first address prefix included in the first router advertisement;
a connection confirmation circuit configured to confirm whether a connection to an external server of the second network via the first wireless device is possible;
an address invalidity request circuit configured to send a second router advertisement for requesting invalidity of the first address when it is confirmed that the connection via the first wireless device is possible;
a route setting instruction circuit configured to instruct the wireless terminal to set a route of a packet sent to the external server of the second network to a route by way of the second wireless device; and
an address setting circuit configured to replace a second address prefix of a source address of the packet with the first address prefix of the second wireless device so as to perform address setting when receiving the packet sent to the external server of the second network from the wireless terminal,
the wireless terminal comprising:
an address generation circuit configured to receive the first router advertisement from the first wireless device to generate a second address based on the second address prefix included in the first router advertisement;
an address change circuit configured to remove the address using the first address prefix of the second wireless device in accordance with the second router advertisement; and
a route setting circuit configured to set the route of the packet sent to the external server of the second network to the route by way of the second wireless device in accordance with a route setting instruction of the second wireless device.

* * * * *